Feb. 22, 1955  H. W. HAPMAN  2,702,625
BUCKET CONVEYER SYSTEM
Filed March 31, 1951  3 Sheets-Sheet 3
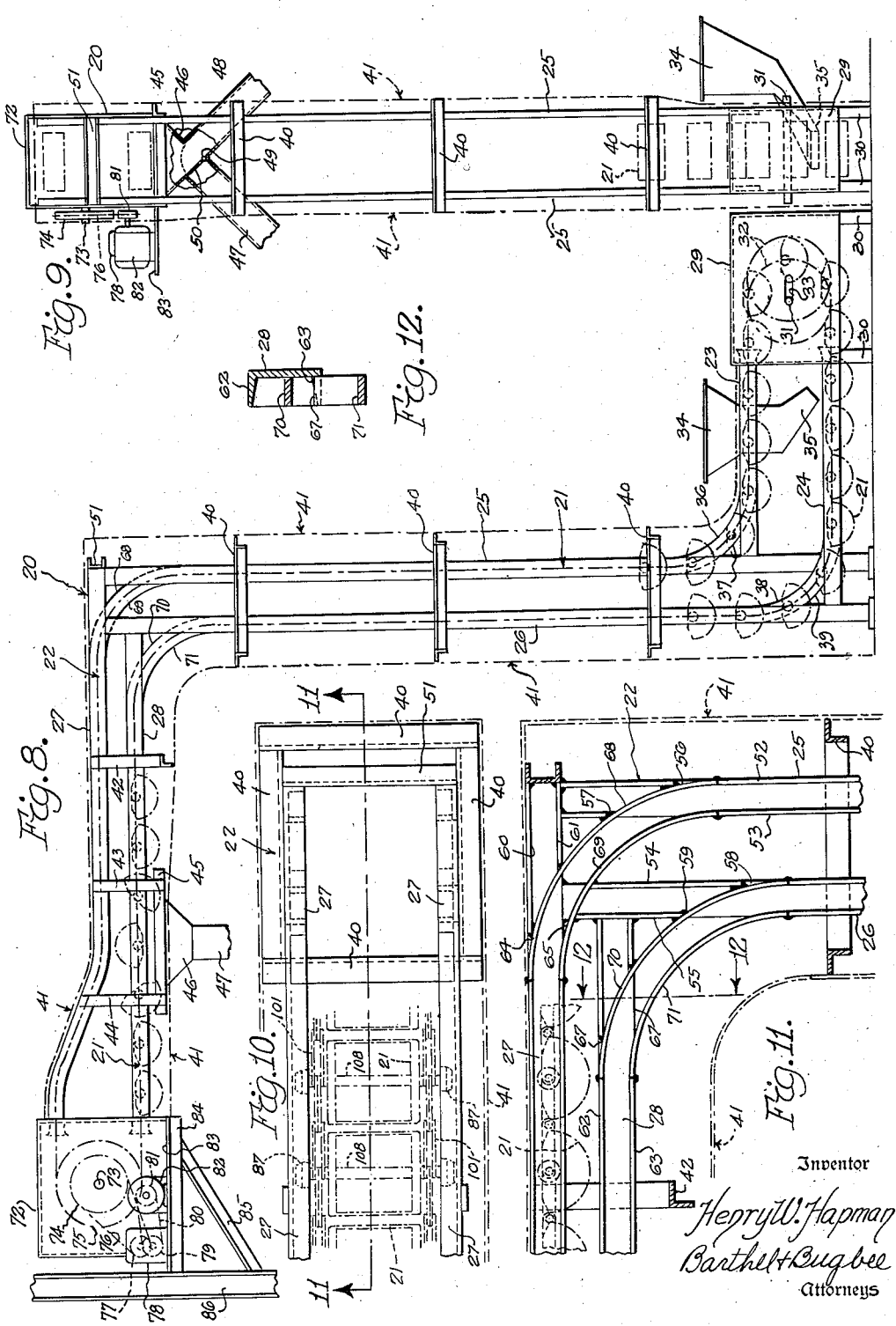
Inventor
Henry W. Hapman
Barthel & Bugbee
Attorneys United States Patent Office 2,702,625
Patented Feb. 22, 1955

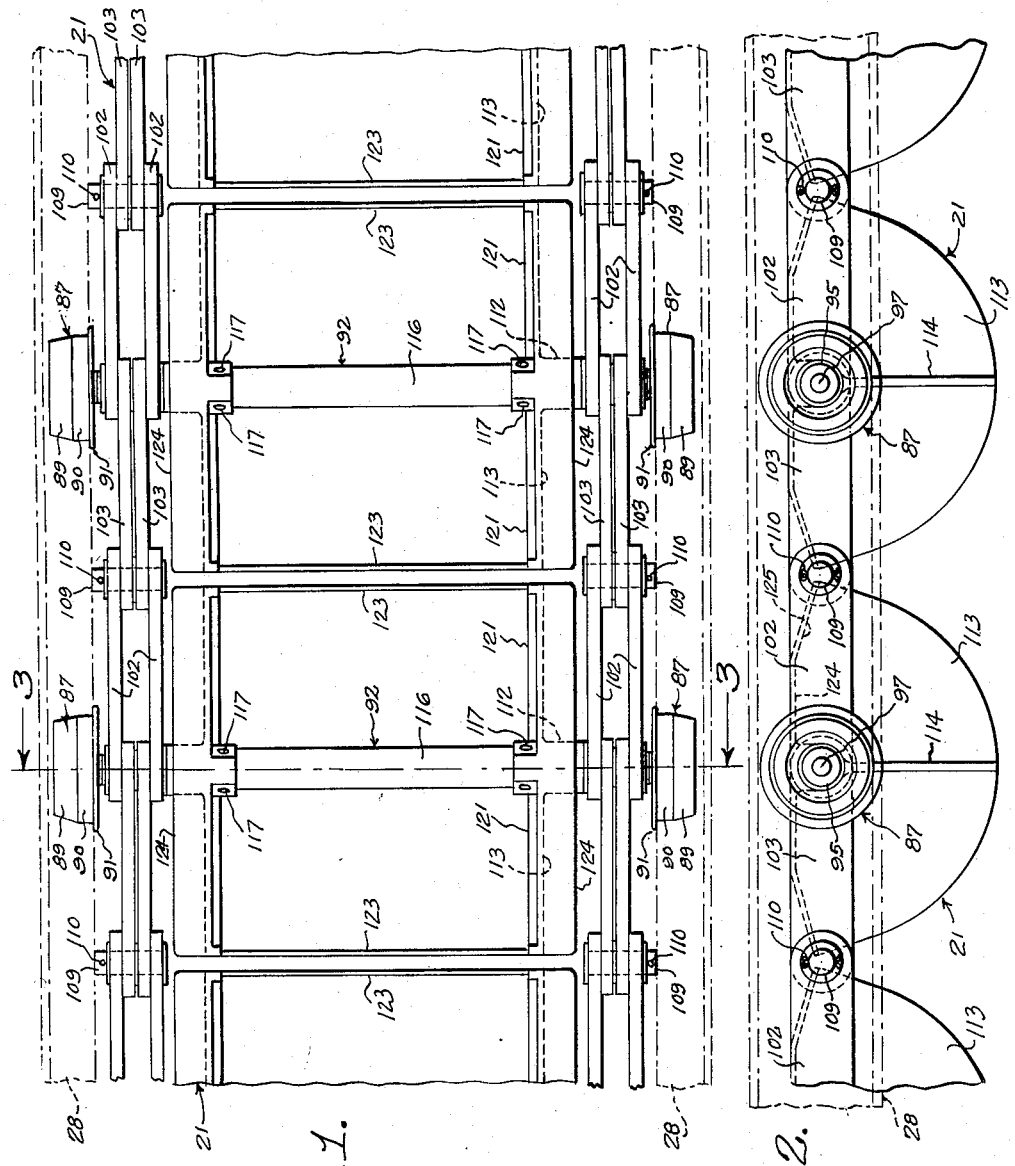

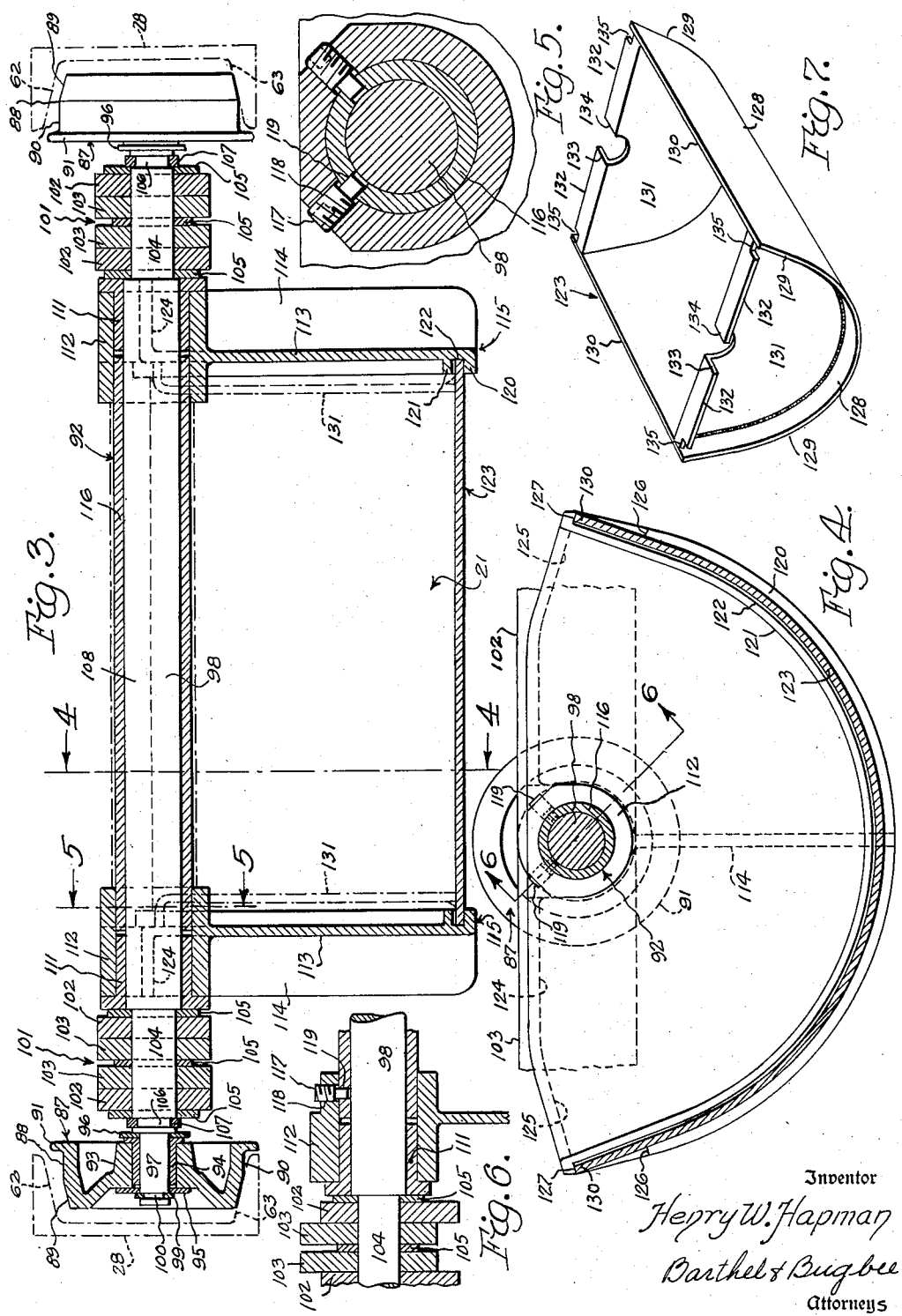

2,702,625

BUCKET CONVEYER SYSTEM

Henry Waldemar Hapman, Kalamazoo, Mich., assignor of forty per cent to Hannah Jane Hapman, Kalamazoo, Mich.

Application March 31, 1951, Serial No. 218,580

3 Claims. (Cl. 198—148)

This invention relates to conveyor systems and, in particular, to bucket conveyor systems.

One object of this present invention is to provide a bucket conveyor system wherein all wearable parts are quickly and easily replaced and wherein the buckets have replaceable liners and their suspension rods have replaceable cover tubes, both of which may be made from corrosion-resistant materials such as stainless steel, these being employed in conveying materials which react unfavorably or undesirably with the iron or steel of which such buckets are ordinarily made, yet wherein the major portions of the bucket structure and its supporting and conveying mechanism are made of cheap or durable materials which cannot otherwise be permitted to come into contact with the conveyed material.

Another object is to provide a bucket conveyor system of the foregoing character wherein the cover tube for the suspension rod of each bucket also serves as a torsion member interconnecting the opposite ends of the bucket, so that the suspension rod is freed from serving as a torsion member.

Another object is to provide a bucket conveyor system wherein the supporting framework for the conveyor system also serves as the guide track for the rollers on the opposite end of the bucket suspension rods, thereby simplifying the structure and reducing its weight as well as its cost.

Another object is to provide a bucket conveyor as set forth in the object immediately preceding, wherein the combination supporting structure and guide tracks consist of channel members having their troughs facing one another in order to receive the bucket rollers and wherein a simple and inexpensive type of commercially available conveyor chain can be used instead of the special conveyor chains of expensive construction hitherto required for such conveyor systems.

Another object is to provide a bucket conveyor system of the foregoing character which can be used for the conveying of materials which would otherwise contaminate ordinary bucket conveyors or which would collect in crevices and decompose or otherwise create a hazard, such as for example, the conveying of radioactive isotopes on the one hand and food products on the other hand, the liners of the buckets having no pockets or crevices for the collection of such materials and being easily removed and replaced when contaminated, eroded or worn.

In the drawings:

Figure 1 is a top plan view of a short section of a bucket conveyor employed in the bucket conveyor system of the present invention, with the guide tracks shown in dotted lines;

Figure 2 is a side elevation of the section of the bucket conveyor shown in Figure 1;

Figure 3 is a vertical longitudinal section through one of the conveyor buckets and its associated mechanism, taken along the line 3—3 in Figure 1;

Figure 4 is a vertical cross-section through the bucket, taken along the line 4—4 in Figure 3;

Figure 5 is a fragmentary vertical cross-section taken along the line 5—5 in Figure 3, showing the connection between the bucket suspension rod cover tube and the bucket end plate hubs;

Figure 6 is an inclined fragmentary longitudinal section taken along the line 6—6 in Figure 4;

Figure 7 is a perspective view of one of the replaceable bucket liners for the buckets shown in Figures 1 to 4 inc.;

Figure 8 is a diagrammatic side elevation of a bucket conveyor system arranged according to the present invention, and employing the buckets shown in Figures 1 to 4 inclusive, in which the supporting frame members also serve as guide tracks for the buckets and in which the enclosing housing and the buckets are shown in dotted lines;

Figure 9 is a right-hand end elevation of the conveyor system shown in Figure 8, with the discharge hopper broken away to show the selective gate for controlling the discharge of the conveyed material to one side or the other;

Figure 10 is an enlarged top plan view of the upper central portion of Figure 8;

Figure 11 is a central vertical section through the conveyor portion shown in Figure 10, taken along the line 11—11 in Figure 10; and Figure 12 is an enlarged vertical section taken along the line 12—12 in Figure 11, and showing the junction of arcuate guide tracks with a horizontal guide track.

*General arrangement*

Bucket conveyor systems as hitherto constructed have often been unsuitable for the conveying of materials which are likely to contaminate the buckets, for example, the conveying of ores or products of nuclear reactors containing radio-active isotopes. In such prior conveyors, the contamination of the conveyor bucket required the replacement of the buckets or the major portions thereof. The same situation has occurred in the conveying of abrasive or corrosive materials which excessively wear or corrode the buckets. In prior bucket conveyors, the supporting structure for the conveyor system has been separate and distinct from the conveyor supporting trackway, with the result that such conveyor systems have been expensive in their first cost and also costly in maintenance.

The present invention provides a bucket conveyor system in which all parts of the conveyor which come into contact with the conveyed materials are quickly and easily replaced without disassembling the complete system, and which may optionally be made of corrosion-resistant material such as stainless steel while the remainder of the conveyor mechanism and structure not coming into contact with the conveyed materials may be made from less expensive material. In particular, the conveyor buckets are provided with removable and replaceable liners (Figure 7) which may be made of stainless steel, synthetic plastic, aluminum, Monel metal or other material suitable to the nature of the substances being conveyed. The end plates of the conveyor buckets are supported from rods or shafts which carry tapered rollers on their outer ends, these rollers being tapered to fit the troughs of standard structural steel channel members, the rollers being provided with flanges which are adapted to engage the edges of arcuate transition members which interconnect the horizontal and vertical channel members of the structure. In this manner, the conveyor supporting structure also serves as the conveyor guide track structure and vice versa. The portions of the bucket suspension shafts between the bucket end plates are also protected by a replaceable cover tube which may be made of the same material as the bucket liner and which also preferably serves as a torsion member interconnecting the bucket end plates and preventing them from weaving relatively to one another.

*Conveyor supporting and guide structure*

Referring to the drawings in detail, Figures 8 and 9 show a bucket conveyor system, generally designated 20, according to the invention, and including an endless bucket conveyor, generally designated 21 traveling in and supported by a combined guide trackway and supporting structure, generally designated 22. In Figures 8 to 11 inclusive, the bucket conveyor 21 is shown in dotted lines, but a short section of it is shown in solid lines in Figures 1 to 4 inclusive.

The combined trackway and supporting structure 22 is shown in Figures 8 to 11 inclusive in one particular installation, other arrangements of course being contemplated, depending upon the layout of the location where the conveying is to take place and the conditions surrounding the conveying action. The structure 22 is fabricated largely from inwardly facing upper and lower horizontal channel members 23, 24 and vertical channel members 25 and 26 forming an approximately L-shaped structure which at its upper end (Figure 8) is connected to upper and lower approximately horizontal guide channel members or tracks 27 and 28 respectively located in the upper part of the installation.

The channel members 23 and 24 at their right-hand ends are connected to a box-like sprocket housing 29 which rests on legs 30 and in which is rotatably mounted a shaft 31 carrying sprockets 32 adapted to receive the sprocket chains of the bucket conveyor 21 as more fully described below. The sprocket shaft 31 is adjustable to and fro horizontally in slots 33 in the sprocket housing 29 in order to take up the slack in the conveyor chain. A material intake hopper 34 is supported in any suitable manner (not shown) adjacent the upper and lower channel members 23 and 24, and has at its lower end a spout 35 which extends over the buckets of the conveyor 21 to deposit therein the material to be conveyed, as described more fully below in connection with the operation of the invention. The left-hand ends of the upper and lower channel members 23 and 24 are welded or otherwise secured to the upright channel members 25 and 26 respectively.

The horizontal and vertical channel members 23 and 25 are interconnected by arcuate concentric bars 36 and 37 (Figure 8) and the horizontal and vertical members 24 and 26 are similarly interconnected by concentric arcuate bars 38 and 39 respectively. The ends of these bars are aligned with and welded to the flanges of the channel members 23 to 26 inclusive to which they are attached and gaps are cut in these flanges in the manner described below in connection with Figures 11 and 12. Secured to the vertical channel members 25, 26 are spaced horizontal angle members 40 which serve not only to tie the channel members 25, 26 together, but also serve for the attachment of an enclosing housing or casing, generally designated 41 and shown in dotted lines in Figures 8 to 11 inclusive. The enclosing housing 41 has been intentionally omitted in order to avoid concealing the conveyor system, and also because in many installations it may be omitted entirely and the conveyor 21 permitted to operate in the open. The upper and lower approximately horizontal channel members 27 and 28 are also tied together by vertical angle members 42 and vertical members 43 and 44 interconnected by horizontal members 45 supporting a discharge hopper 46 having dual spouts 47 and 48. Mounted in the discharge hopper 46 at the junction of the spouts 47 and 48 is a pivot shaft or rod 49 (Figure 9) upon which is mounted a swing or diversion gate 50 which can be swung to one side or the other in order to close the entrance to either of the spouts 47 and 48 and permit the entire contents of the hopper 46 to be discharged through the spout which is not so covered.

The upper channel members 27 are welded or otherwise secured to the upper ends of the vertical channel members 25 and 26 (Figure 8) and are also interconnected by a horizontal channel member 51. The lower horizontal channel members 28, on the other hand, are welded or otherwise secured at their right-hand ends to the channel members 26 (Figure 11). The side flanges 52 and 53 of the vertical channel members 25 and the side flanges 54 and 55 of the vertical channel members 26 are provided with gaps 56, 57, 58 and 59 respectively formed by cutting away these flanges (Figure 11) and the upper and lower channel members 27 and 28 have their side flanges 60, 61, 62 and 63 similarly provided with gaps 64, 65, 66 and 67 repectively by cutting away these flanges in order to receive arcuate guide bars 68, 69, 70 and 71 (Figure 12) which are welded at their opposite ends to their respective flanges and form transition tracks by which the conveyor bucket rollers may travel from the vertical channel members 25 and 26 to the horizontal channel members 27 and 28 and vice versa, according to the direction of travel of the conveyor. By a similar arrangement of gaps in the flanges of the lower portions of the channel members 25 and 26, the arcuate bars 36, 37, 38 and 39 form transition tracks between the lower portions of the vertical channel members 25 and 26 and the upper and lower horizontal channel members 23 and 24 (Figure 8).

The left-hand ends of the channel members 27 and 28 are secured as by welding to the box-like drive housing 72 in the opposite side walls of which is journaled a shaft 73 carrying a pair of drive sprockets 74 around which are trained the conveyor chains of the bucket conveyor 21, as described below. Also drivingly secured to the shaft 73 is a pulley or sprocket 75 which is driven by a belt or chain 76 from an output sprocket or pulley 77 of a reduction gear box 78, the input sprocket or pulley 79 of which is driven by a belt 80 from a sprocket or pulley 81 of an electric motor 82. The electric motor 82, reduction gear box 78 and drive housing 72 are mounted on a platform 83 (Figure 9) supported by channel members 84 and 85 which are welded or otherwise secured to vertical channel members 86 extending downward to the ground or floor.

*Bucket conveyor construction*

The bucket conveyor 21 is supported by rollers 87 which travel in the troughs of the various channel members such as, for example, the lower channel members 28 (Figure 3). Since the troughs of the standard channel members have inclined side walls, due to the fact that the channel flanges have their inner walls inclined at angles of approximately 13 degrees to their webs, the rollers 87 are provided with peripheries 88 which are partially tapered as at 89 to fit the incline of the channel flanges 62, 63, etc. and partially straight, as at 90 (Figure 3). The rollers 87 are also provided with peripheral flanges 91 which are adapted to engage the edges of the arcuate bars 36, 37, 38, 39 or 68, 69, 70 and 71 and prevent the conveyor bucket assemblies or units, generally designated 92, from moving laterally an undesired amount, or from slipping off their guide tracks.

The hubs 93 of the rollers 87 are journaled upon flanged sleeve bearings 94 preferably of the lubricant-impregnated powdered metal type and held in place by outer and inner washers 95 and 96 mounted on the reduced diameter end portions 97 of the bucket suspension shafts or rods 98 (Figure 3). The outer washer 95 of each roller 87 is held in position by a snap ring 99 engaging a groove 100 in the end of the reduced diameter portion 97.

The bucket units 92 are conveyed around their circuits by conveyor chains, generally designated 101 and having outer links 102 and inner links 103 bored to receive the intermediate reduced diameter portion 104 of the bucket suspension shaft 98 (Figure 3). Washers 105 are interposed between the links 103 and also at the ends of the reduced diameter portion 104, which is provided with a groove 106 engaged by a snap ring 107 for retaining the conveyor chain 101 and washers 105 in position. The intermediate reduced diameter portion 104 terminates in an annular shoulder between it and the main shaft portion 108. The outer and inner links 102 and 103 at locations between the buckets and their suspension shafts 98 (Figure 1) are bored to receive flanged or headed pivot pins 109 and held in assembly by cotter pins or other fasteners 110. The outer and inner links 102 and 103 are similarly spaced apart from one another by washers 105 (Figure 1) as previously described in connection with their mounting upon the intermediate reduced diameter portions 104 of the shafts 98. As previously stated, the conveyor chains 109 are endless and at the opposite ends of their courses (Figure 8) are trained around the upper and lower sprockets 74 and 32 and driven by the motor 81 through the mechanism located on the platform 83 and in the drive housing 72.

Mounted on the outer ends of the main shaft portion 108 of each bucket suspension shaft are sleeve bearings 111 which swingably support the hubs 112 of bucket end plates 113. The latter are of approximately semi-circular outline and have approximately radial ribs 114 or fins for engagement with stops (not shown) for tilting or inverting the buckets, generally designated 115, over the discharge hopper 46, as shown in the upper left-hand portion of Figure 8. The bucket hubs 112 are also connected to the opposite ends of a cover tube 116 by set screws 117 threaded through bores 118 (Figures 5 and 6) into holes 119 in the end portions of the cover tube 116. In this manner, the bucket end plates 113 are connected to one another and prevented from weaving by the cover tube 116. The cover tube 116 serves as a protective tube for the shaft 98 and may be of any suitable material which is not attacked by the material to be conveyed, or which is expendable. For example, the tube 116 may be made of stainless steel, aluminum, Monel metal or synthetic plastic.

On their inner faces, the end plates 113 are provided with approximately concentric arcuate outer and inner ribs 120 and 121 respectively forming an arcuate groove 122 between them (Figure 3) which is adapted to receive the detachable and renewable bucket liner 123. The upper edge of each end plate 113 is also provided with a flange 124 (Figure 4) extending horizontally outward in opposite directions from the end plate hub 112 and terminating in downwardly inclined portions 125. The outer rib 120 terminates as at 126 short of the top edge flange portion 125 and the inner rib 121 at its junction with the upper edge flange portion 125 is provided with an abutment shoulder 127.

The bucket liners 123 (Figure 7) are formed of a bottom member 128 of sheet material bent into semi-cylindrical form and having its end edges 129 inserted in the grooves 122 between the outer and inner ribs 120 and 121 whereas its upper edges 130 are held in place by the abutment shoulders 127. The set screws 117, by securing the end plate hubs 112 to the cover tube 116, cause the cover tube 116 also to serve as a tie member holding the bottom member 128 in position in the end plates 113. If the contents of the bucket 115 are contaminative or corrosive materials, the liners 123 are additionally provided with ends 131 spaced inwardly from the end edges 129 of the bottom member 128 and secured thereto as by welding. The upper edge portion of each liner end 131 is bent horizontally outward to form protective flanges 132, the inner ends 133 of which are spaced apart from one another by semi-circular notches 134 which fit snugly against the bucket end plate hub 111 (Figure 3). The outer ends of the flanges 132 are notched as at 135 for the passage of the upper portions of the inner rib 121 and its abutment ends 127 (Figure 4).

In Figure 3, the liner ends 131 are shown in dotted lines to indicate that they are optionally provided. Where it is not necessary to provide protection for the end plates 113 or prevention of contamination of the end plates 113 by the conveyed materials or vice versa, the liner ends 131 may be omitted, whereupon the liner consists merely of the semi-cylindrical sheet member 128 which may then be made ordinary materials such as ordinary sheet steel. In the event that contaminative materials or food products are being conveyed, the liners 123 are made of material similar to the cover tubes or protective tubes 116, namely stainless steel, Monel metal, synthetic plastic or aluminum.

*Operation*

In the operation of the conveyor system 20 of the invention (Figures 8 to 12 inclusive), the motor 81 is started, causing the rotation of the drive sprockets 74 within the drive housing 72. This causes the conveyor chains 101 of the bucket conveyor 21 to move in an endless path while the rollers 88 roll along the trackways provided by the flanges of the various channel members 23 to 28 inclusive. While the rollers are thus traveling, their beveled outer portions 89 engage the inclined inner walls of the flanges of the channel members, and the roller flanges 91 prevent endwise shifting of the rollers 87 and their bucket units 92. As the bucket units 92 pass beneath the spout 35 of the receiving hopper 34, they are filled with the material to be conveyed, and pass onward along the channel member 24 until they come to the arcuate transition bars 38.

Here they roll through the gaps in the channel member flanges, roll along the bars 38, 39 and pass through the flange gaps into the vertical channel members 26. As previously stated, the construction at the lower-corner location 36, 37, 38, 39 is similar to that at the upper corner location shown in Figure 11. The buckets 115 with their loads remain horizontal as they travel upward in the vertical channel members 26 and pass through the gaps 59 and 67 while engaging the transition bars 70, 71 (Figure 11) in passing from the vertical channel members 26 to the horizontal channel members 28. Here they roll a short distance onward until they arrive over the discharge hopper 46 where stops (not shown) engage the radial ribs or fins 114, inverting the buckets one by one and dumping their contents into the discharge hopper 46. The position of the gate 50 (Figure 9) determines whether the contents will be discharged through the spout 47 or the spout 48. In the position shown in Figure 9, the dumped materials will be discharged through the spout 48.

The now empty buckets are carried upward as their conveyor chains 101 traverse the drive sprocket 74 and are returned along the upper channel member 27 with their rollers rolling in the trackway thus formed, as shown in the upper portion of Figure 11. When the rollers 87 arrive at the gaps 64, 65 in the flanges 60, 61 of the channel members 27, they engage the arcuate transition bars 68, 69 and pass downward through the gaps 57 into the space or trough between the flanges 53 and 52 of the vertical channel members 25. The buckets descend in this manner until they reach the arcuate transition bars 36 and 37, whereupon they pass through the gaps similarly provided in the channel member flanges and travel along the horizontal channel members 23 until their chain portions 101 pass around the idler sprockets 32, completing the circuit beneath the spout 35 of the receiving hopper 34.

To change the liner 123 and protective tube 116, it is merely necessary to separate the end plates 113 and remove the pulleys 87 and conveyor chain links 101, 102, taking out the used liner 123 and cover tube 116 and replacing them with new ones.

While the various conveyor buckets are illustrated in Figures 1 and 2 as having gaps between their adjacent edges, in actual practice, a device would be employed for preventing loss or spillage of conveyed material through these gaps at the loading station or hopper 34 of the conveyor (Figure 12). Such devices have been disclosed and claimed in my previous patents.

The cover tube 116, in order to conserve critical metals, instead of being made of stainless steel, aluminum or Monel metal throughout, as stated above, may optionally be made of standard iron or steel pipe or tubing covered by a very thin sheet or coating of protective material such as aluminum, Monel metal or stainless steel. This construction also permits the use of structurally stronger materials for the cover tube 116, especially in cases where aluminum is required for the bucket liner 123, aluminum being a metal of inferior strength. For convenience, in such an installation, the cover tube 116 is optionally wrapped with aluminum foil as a protective coating.

What I claim is:

1. A floor-mounted bucket conveyor system comprising a self-sustaining upright conveyor-supporting framework having a lower portion resting upon the floor and an upper portion rising therefrom, said upper portion consisting of two pairs of laterally spaced substantially parallel vertical channel members connected to said lower portion and disposed adjacent one another with their channels facing inwardly toward one another, and side and cross tie members transversely interconnecting said channel members at right angles to one another, said channel members constituting the sole and entire vertical supporting members of said upper portion of said framework; a plurality of pairs of wheels rotatably mounted on upper and lower levels of said framework at locations remote from one another, a pair of parallel laterally-spaced endless conveyor chains trained around said wheels and arranged to travel adjacent said channels, bucket supporting shafts connected to said conveyor chain at intervals therealong and disposed transversely thereto, rollers mounted on the outer ends of said shafts and engaging said channels, and conveyor buckets tiltably supported on said shafts whereby said channel members structurally support said conveyor system and at the same time form trackways for said rollers.

2. A floor-mounted bucket conveyor system comprising a self-sustaining upright conveyor-supporting framework having a lower portion resting upon the floor and an upper portion rising therefrom, said upper portion consisting of a plurality of pairs of laterally-spaced substantially parallel vertical channel members connected to said lower portion and disposed adjacent one another with their channels facing inwardly toward one another, said framework also having a horizontal portion connected to said upper portion and extending horizontally therefrom, said horizontal portion including two pairs of laterally-spaced substantially parallel horizontal channel members also disposed adjacent one another with their channels also facing inwardly toward one another, certain of said pairs of channel members being disposed at an angle to one another and forming a bend in said framework, said channel members having flanges with roller gaps therein adjacent said bend, arcuate guide members spanning said bend and having their opposite ends aligned with and secured to said flanges adjacent said gaps, and side and cross tie members transversely interconnecting said channel members at right angles to one another, said channel members constituting the sole and entire vertical supporting members of said upper portion of said framework; a plurality of pairs of wheels rotatably mounted on upper and lower levels of said framework at locations remote from one another, a pair of parallel laterally-spaced endless conveyor chains trained around said wheels and arranged to travel adjacent said channels, bucket supporting shafts connected to said conveyor chains at intervals therealong and disposed transversely thereto, rollers mounted on the outer ends of said shafts and engaging said channels, and conveyor buckets tiltably supported on said shafts whereby said channel members structurally support said conveyor system and at the same time form trackways for said rollers.

3. A floor-mounted bucket conveyor system comprising a self-sustaining upright conveyor-supporting framework having a lower portion resting upon the floor and an upper portion rising therefrom, said framework consisting of two pairs of laterally-spaced substantially parallel vertical channel members connected to said lower portion and disposed with their channels facing inwardly toward one another, said framework also having a generally horizontal portion connected to said vertical channel members and extending approximately horizontally therefrom, said generally horizontal portion including two pairs of laterally-spaced substantially parallel approximately horizontal channel members also disposed with their channels also facing inwardly toward one another, certain of said pairs of channel members being disposed at angles to one another and forming bends in said framework, said channel members having flanges with roller gaps therein adjacent said bends, arcuate guide members spanning said bends and having their opposite ends aligned with and secured to said flanges adjacent said gaps, and side and cross tie members transversely interconnecting said channel members at right angles to one another, said vertical channel members constituting the sole and entire vertical supporting members of said framework; a plurality of pairs of wheels rotatably mounted on upper and lower levels of said framework at locations remote from one another, a pair of parallel laterally-spaced endless conveyor chains trained around said wheels and arranged to travel adjacent said channels, bucket supporting shafts connected to said conveyor chains at intervals therealong and disposed transversely thereto, rollers mounted on the outer ends of said shafts and engaging said channels, and conveyor buckets tiltably supported on said shafts whereby said channel members structurally support said conveyor system and at the same time form trackways for said rollers.

References Cited in the file of this patent
UNITED STATES PATENTS

| | | |
|---|---|---|
| 714,150 | Clarke | Nov. 25, 1902 |
| 941,045 | Sauerman | Nov. 23, 1909 |
| 1,038,608 | Lawyer | Sept. 17, 1912 |
| 1,473,258 | Steedsman et al. | Nov. 6, 1923 |
| 2,426,304 | Hapman | Aug. 26, 1947 |
| 2,435,498 | Hapman | Feb. 3, 1948 |
| 2,559,615 | Hapman | July 10, 1951 |